United States Patent
Samuel

(10) Patent No.: US 8,532,136 B1
(45) Date of Patent: Sep. 10, 2013

(54) COMMUNICATION WITH A HANDSET VIA A PRIVATE NETWORK

(75) Inventor: Balasingh P. Samuel, Suwanee, GA (US)

(73) Assignee: American Megatrends, Inc., Norcross, GA (US)

( * ) Notice: Subject to any disclaimer, the term of this patent is extended or adjusted under 35 U.S.C. 154(b) by 1812 days.

(21) Appl. No.: 11/253,384

(22) Filed: Oct. 19, 2005

(51) Int. Cl.
*H04L 12/66* (2006.01)

(52) U.S. Cl.
USPC .......... 370/463; 370/461; 370/465; 709/231; 709/232; 709/227

(58) Field of Classification Search
USPC ......................................... 709/250; 455/419
See application file for complete search history.

(56) References Cited

U.S. PATENT DOCUMENTS

| | | | | |
|---|---|---|---|---|
| 5,845,282 A | * | 12/1998 | Alley et al. | 707/10 |
| 6,088,730 A | * | 7/2000 | Kato et al. | 709/227 |
| 2003/0045316 A1 | * | 3/2003 | Tjong et al. | 455/517 |
| 2003/0054818 A1 | * | 3/2003 | Bahl et al. | 455/432 |
| 2004/0054794 A1 | * | 3/2004 | Lantto et al. | 709/229 |
| 2004/0122651 A1 | * | 6/2004 | Herle | 703/27 |
| 2004/0210433 A1 | * | 10/2004 | Elazar et al. | 703/24 |
| 2005/0083741 A1 | * | 4/2005 | Chang et al. | 365/200 |
| 2005/0186953 A1 | * | 8/2005 | Harris | 455/419 |
| 2006/0079284 A1 | * | 4/2006 | Lu et al. | 455/558 |
| 2007/0239857 A1 | * | 10/2007 | Mahalal et al. | 709/219 |

\* cited by examiner

*Primary Examiner* — Ian N Moore
*Assistant Examiner* — Jackie Zuniga
(74) *Attorney, Agent, or Firm* — Hope Baldauff, LLC

(57) ABSTRACT

Aspects of the present invention provide communication with a handset utilizing industry standard TCP/IP protocol. According to one aspect of the present invention, a handset includes a processor, web server program, and first virtual network adapter. The first virtual network adapter emulates a network adapter operative to provide network access to the handset. The handset includes a second virtual network adapter that emulates a second network adapter operative to provide network access to a computing device connected to the handset. Communication occurs over a private network established between the computing device and the handset using the TCP/IP protocol. A custom web page file stored on the handset and provided to the web browser program of the computing device renders a user-friendly web page interface.

18 Claims, 4 Drawing Sheets

COMMUNICATION WITH A HANDSET VIA A PRIVATE NETWORK

TECHNICAL FIELD

The present invention is related to the field of private network communication. More particularly, the present invention is related to the field of synchronizing, transferring, and managing data via a private network between a computing device and a hand-held device.

BACKGROUND OF THE INVENTION

It is becoming increasingly popular for people to rely on hand-held devices ("handsets") for storing and retrieving data. People often look to their cellular telephones, personal data assistants, beepers, and portable music players for telephone numbers, schedules, contact information, calendars, and even documents, spreadsheets, and other detailed information typically found on a desktop or laptop computer. Synchronizing data between a computer and a handset involves a myriad of complex methods that often include proprietary host computer drivers or hardware. In addition to using custom proprietary interfaces, other examples of methods that users employ to manage data on a handset using a computer includes OBEX ("Object Exchange"), QUALCOMM DIAGNOSTIC INTERFACE, and BITPIM. Current data management methods often require a dedicated application installed on the computer in order to access and manage data on a handset. There is currently no standard available that enables secure management of a handset using a computer with a familiar, user-friendly interface, without requiring dedicated software on the computer.

It is with respect to these and other considerations that the various embodiments of the present invention have been made.

SUMMARY OF THE INVENTION

Aspects of the present invention address these problems and others by providing communication with a handset via a private network utilizing industry standard TCP/IP protocol. According to one aspect of the present invention, a handset includes a processor, a web server program, and a first virtual network adapter. The first virtual network adapter emulates a network adapter that is operative to provide network access to the web server program. The handset additionally includes a second virtual network adapter that emulates a second network adapter operative to provide network access to a computing device that is communicatively linked to the handset.

The second virtual network adapter comprises an endpoint controller for connecting the handset to a connection medium, as well as program code operative to mediate between the connection medium and the first virtual network adapter. The connection medium may be a Universal Serial Bus ("USB") connection or FIREWIRE connection, or any other connection medium known in the art. The handset may additionally include management software for responding to requests from the web server program for data storage and retrieval, as well as a web page file configured as a user interface for sending commands from the computing device to the management software. It should be understood that a web page file is any file having program code interpreted and displayed by a web browser program to include at least one selectable action for synchronizing, transferring, or managing data. The web page file may consist of any type of markup language file, including HTML program code or any other program code capable of interpretation by a web browser program. The web server program is operative to receive a request for access to the handset from the computing device, to transmit the at least one web page file to the computing device for display and user interaction, to receive a command selected on the resulting web page at the computing device, to interpret the received command, and to instruct the appropriate management software to execute the command.

According to another aspect of the present invention, a computer-readable medium is provided that has computer executable instructions stored thereon, which when executed, causes a handset to receive a request for a web page file from a computing device via a first virtual network adapter located at the handset. The first virtual network adapter is associated with a connection medium connecting the handset to the computing device and is operative to connect the computing device to a network. The handset retrieves the web page file in response to the request and to send the web page file via a second virtual network adapter located at the handset. The second virtual network adapter is operative to connect the handset to a network. The connection medium may be a direct physical connection medium such as a USB or FIREWIRE cable. When rendered, the web page is operative to provide at least one selectable command for managing the configuration of the handset. The handset may additionally receive a command selection from the web page user interface, determine at least one appropriate application recipient for the selected command, send the command to the appropriate application associated with the selected command, and execute the command.

According to yet another aspect of the present invention, a computer-readable medium is provided that has computer executable instructions stored thereon, which when executed, causes a handset to receive a request for a web page file from a computing device via a USB virtual network adapter located at the handset. The USB virtual network adapter is associated with a USB endpoint controller in communication with the computing device via a USB cable connected to the USB endpoint controller at one end and to a USB host controller of the computing device at the other end. The handset retrieves the web page file in response to the request. When rendered, the web page provides a user interface with at least one selectable command for managing data on the handset. The handset sends the web page file via a virtual network adapter located at the handset. The virtual network adapter is operative to connect the handset to the computing device by mediating between the web server program and the USB virtual network adapter. The handset receives selection of at least one command from the computing device and determines an appropriate application recipient for the selected command. The handset sends the command to the appropriate application associated with the selected command and then executes the command.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent

DETAILED DESCRIPTION OF THE INVENTION

As described briefly above, embodiments of the present invention provide communication with a handset utilizing industry standard TCP/IP protocol. These embodiments may be combined, other embodiments may be utilized, and structural changes may be made without departing from the spirit and scope of the present invention. The following detailed description is, therefore, not to be taken in a limiting sense, and the scope of the present invention is defined by the pending claims and their equivalents.

Embodiments of the present invention enable simplified communication with a handset utilizing a web browser program on a computing device and a wired connection between the two devices. Communication may include data transfer from one device to the other, data synchronization between the two devices, and management of data on the handset, such as data for configuring the operation of the handset. A computing device web browser program provides a user with a recognized user interface through which the user may input commands for transferring, synchronizing, or managing data. The handset provides a web page file to the computing device web browser program utilizing a web server program located on the handset. However, utilizing embodiments of the present invention, access to the Internet is not required in order to communicate between the computing device and handset.

By utilizing a virtual network adapter in the handset that emulates a network adapter in the computing device, a common and familiar web browser program interface may be used to share data via a cable using the TCP/IP protocol without requiring dedicated hardware or software in the computing device. In this manner, users are provided with an interface that they are already familiar with, namely their web browser program. The interface may be customized to include selectable buttons for synchronizing data from any application located on the handset and computing device, transferring data from one device to the other, as well as buttons for updating firmware. These buttons call management software located on the handset or computing device to access the requested data or perform the requested action via the connection medium linking the two devices. The web browser program interface can be used as an interface for all data and applications on the handset. For example, pictures and music files may be transferred to and from the handset utilizing the connection medium and web browser program interface. In short, embodiments of the present invention provide users with a familiar web browser program interface for managing and transferring data between a computing device and a handset utilizing a TCP/IP standard protocol with a virtual network connection without requiring actual connection to the Internet.

Figure 1:
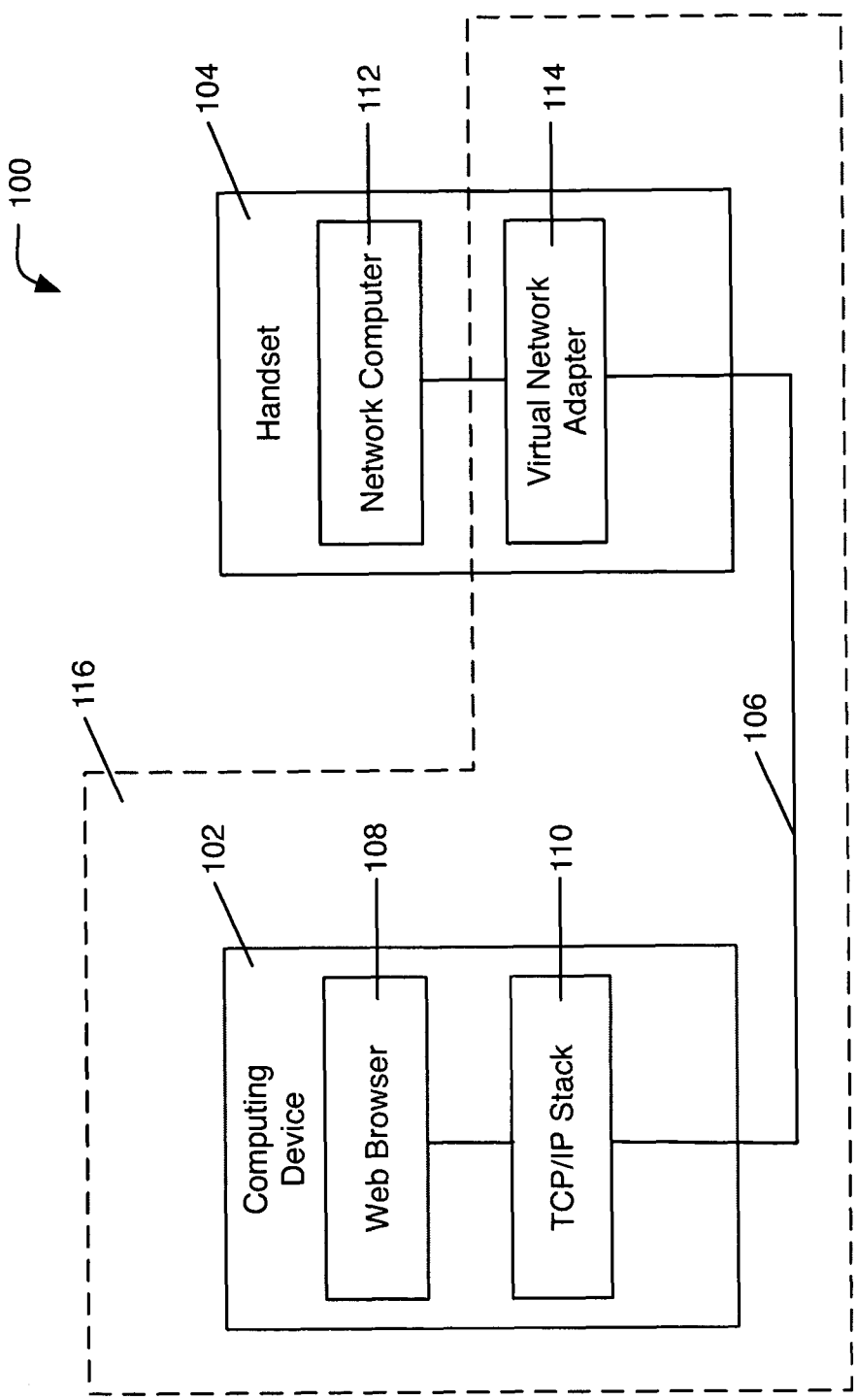
FIG. 1 is a computer architecture diagram showing aspects of a computer architecture for a computing device and handset communicating over a private network utilized in the various embodiments of the invention.
Figure 2:
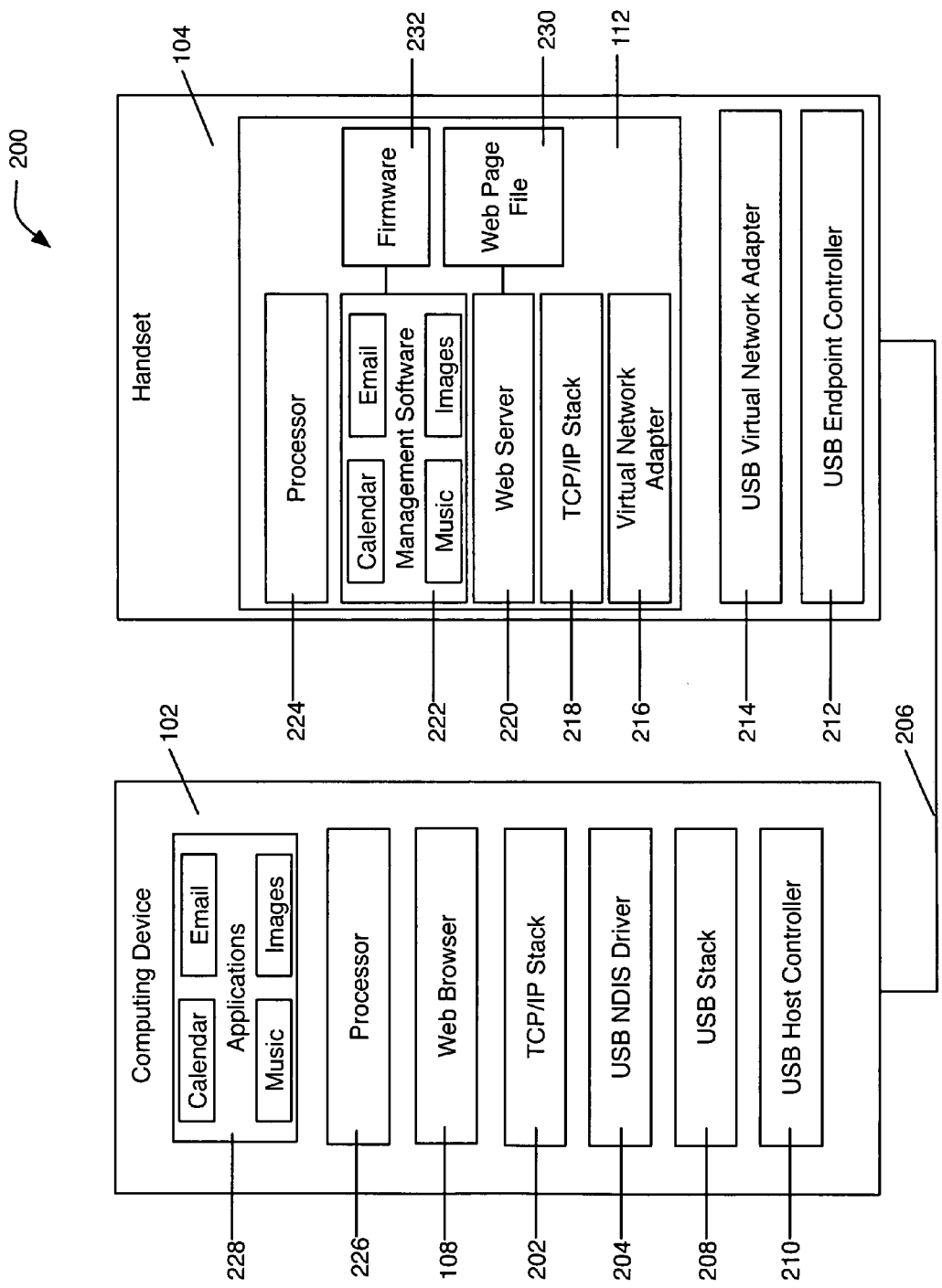
FIG. 2 is a computer architecture diagram further showing aspects of a computer architecture for a computing device and handset communicating over a private network utilized in the various embodiments of the invention.

FIGS. 1 and 2 and the following discussion are intended to provide a brief, general description of a suitable computing environment in which the invention may be implemented. FIG. 1 shows data exchange system 100 including computing device 102 and a handset 104 communicatively linked for sharing data. It should be understood that computing device 102 may be a desktop or laptop computer, or any other computing device with the capabilities described below with reference to FIG. 2. Similarly, handset 104 may be a cellular telephone, personal data assistant, beeper, portable music player, or any other hand-held device capable of storing data. Those skilled in the art will appreciate that the invention may be practiced with other computer system configurations, including not only hand-held devices, but also multiprocessor systems, microprocessor-based or programmable consumer electronics, minicomputers, mainframe computers, and the like. Computing device 102 includes a web browser program 108 and a TCP/IP stack 110 for enabling network communications. It should be appreciated that FIG. 1 is intended to show a greatly simplified operating environment for clarity. More detail as to the components and operation of computing device 102 and handset 104 will be discussed with respect to FIG. 2.

Handset 104 includes network computer 112 and virtual network adapter 114. Computing device 102 and handset 104 are physically connected via cable 106. For illustration purposes, computing device 102 and handset 104 will be described as being physically connected via USB cable 106. Consequently, corresponding hardware for facilitating a USB connection will also be described. Most modern computers and many handsets already include USB connectors and hardware, simplifying the implementation of this invention. However, it should be appreciated that any physical medium, such as FIREWIRE, capable of carrying data between computing device 102 and handset 104 may be used, along with the corresponding hardware and software necessary to implement the particular medium used. Alternatively, it should be appreciated that cable 106 and corresponding support components may be replaced by wireless transmission and reception hardware.

FIG. 1 shows a hatched line that encompasses the components of network computer 116. Network computer 116 is shown to illustrate the physical location of the network components of computing device 102. In order for a computing device to gain access to a network, such as the Internet, the computing device will typically contain a network adapter. Network adapters are well known by those with skill in the art. Typically, a network adapter is a PCI card with a network port, such as an Ethernet port, that is installed within the computing device for which it will provide network access. Alternatively, a network adapter may be any hardware that mediates between the computer in which it is installed and a network. Neither network computer 116 nor network computer 112 contains a typical network adapter in the form of a PCI card or other hardware for connection to a network. Rather, each contains a virtual network adapter in the form of software that emulates a hardware network adapter. It should be understood that although computing device 102 may contain a typical installed PCI or other hardware network adapter, the installed PCI network adapter will not be used for direct connection to handset 104 for data sharing.

Instead of using a typical network adapter installed into a PCI slot of computing device 102, computing device 102 communicates with handset 104 over a private network through virtual network adapter 114. Virtual network adapter 114 is code that is stored on handset 104 to emulate the functions of a physical network adapter as if it were installed within computing device 102. Virtual network adapter 114 communicates with a processor and other components of computing device 102 (as shown in FIG. 2) via USB cable 206 and corresponding controller located at computing device 102. The virtual network adapter 114 appears to the computing device 102 as a hardware network adapter. By storing the virtual network adapter 114 on handset 104, only the handset manufacturer or other service provider has to provide the necessary components for exchanging data with a computer, allowing any computer with a web browser program and connection medium to connect to the handset for data exchange or management. Utilizing embodiments of the present invention, a user may access and manage data on her handset using any computer terminal with a web browser program and USB or other connection media port and a corresponding cable for connection between the two devices. By using a web browser program to access handset data, the user is provided with a familiar, user-friendly interface that is easily customizable by the handset manufacturer or service provider.

Turning now to FIG. 2, the applicable components of data exchange system 200 comprising computing device 102 and handset 104 will be described. As stated above, computing device 102 includes web browser program 108. Additionally, computing device 102 contains TCP/IP stack 202 as a protocol for enabling communications on a network. NDIS driver 204 provides a software interface that enables different network protocols to communicate with a variety of network adapters, in this configuration allowing the TCP/IP stack 202 to communicate with USB stack 208 and USB host controller 210. Driver 204 is in compliance with the open standard Communication Device Class Ethernet Control Model ("CDC ECM") specification. USB stack 208 provides a set of USB drivers that control the USB host controller 210. USB host controller 210 is hardware located on computing device 102 for connecting to USB cable 206 and for transmitting and receiving information through the cable. Computing device 102 also contains processor 226 and applications 228. Applications 228 may include electronic mail, appointment calendar, music and image applications, and any other application.

Handset 104 includes a USB endpoint controller 212 for connecting to USB cable 206 and for transmitting and receiving information through the cable. USB virtual network adapter 214 comprises program code operative to mediate between the USB endpoint controller 212 and the network computer 112, emulating a network adapter in computing device 102. Because USB virtual network adapter 214 is located within handset 104, the handset acts as a network adapter for the computing device 102 when USB cable 206 is connected to the computing device and to the handset. So, functionally, from the perspective of computing device 102, when the handset 104 is connected to the computing device 102, the computing device recognizes the handset as a network adapter. If a network adapter already exists within the computing device 102, then the computing device recognizes the virtual network adapter 214 as a second network adapter. The USB virtual network adapter 214 is created through firmware loaded on the handset 104 in compliance with CDC ECM specification that simulates the USB endpoint controller 212 as a network adapter. In this manner, USB virtual network adapter 214 includes program code that enables the virtual adapter to operate as a computing device network adapter commonly known by those skilled in the art.

It should be understood that virtual network adapter 214 includes program code that allows for communication between network computer 112 and computing device 102 via USB endpoint controller 212. If another connection medium such as FIREWIRE is to be used to connect handset 104 to computing device 102, virtual network adapter 214 would include program code that allows for communication via the appropriate hardware controller corresponding to the connection medium. It will be appreciated by those skilled in the art that more than one virtual network adapter 214 may be included within handset 104 to allow for various connection mediums. Handset 104 also includes processor 224 and management software 222. Management software may contain electronic mail, appointment calendar, music and image applications, and any other application. Firmware 232 and markup language file 230 are also a part of network computer 112 and will be described below with respect to FIG. 3.

While FIG. 2 shows the applicable components of computing device 102 and handset 104 for operation of embodiments of the present invention, it is also contemplated that the computing device 102 and handset 104 may not include all of the components shown in FIG. 2, may include other components that are not explicitly shown in FIG. 2, or may utilize an architecture completely different than that shown in FIG. 2. Additional components may include but are not limited to mass storage devices, volatile and non-volatile memory, in the forms of random access memory and read only memory, for storage of applications, application data, and an operating system. Handset 104 utilizes a real-time operating system for rapid response times. Computing device 102 and handset 104 components are communicatively connected utilizing an internal bus as known by those skilled in the art.

Although the description of computer-readable media contained herein refers to a mass storage device, such as a hard disk or CD-ROM drive, it should be appreciated by those skilled in the art that computer-readable media can be any available media that can be accessed by a computer. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

Figure 3:
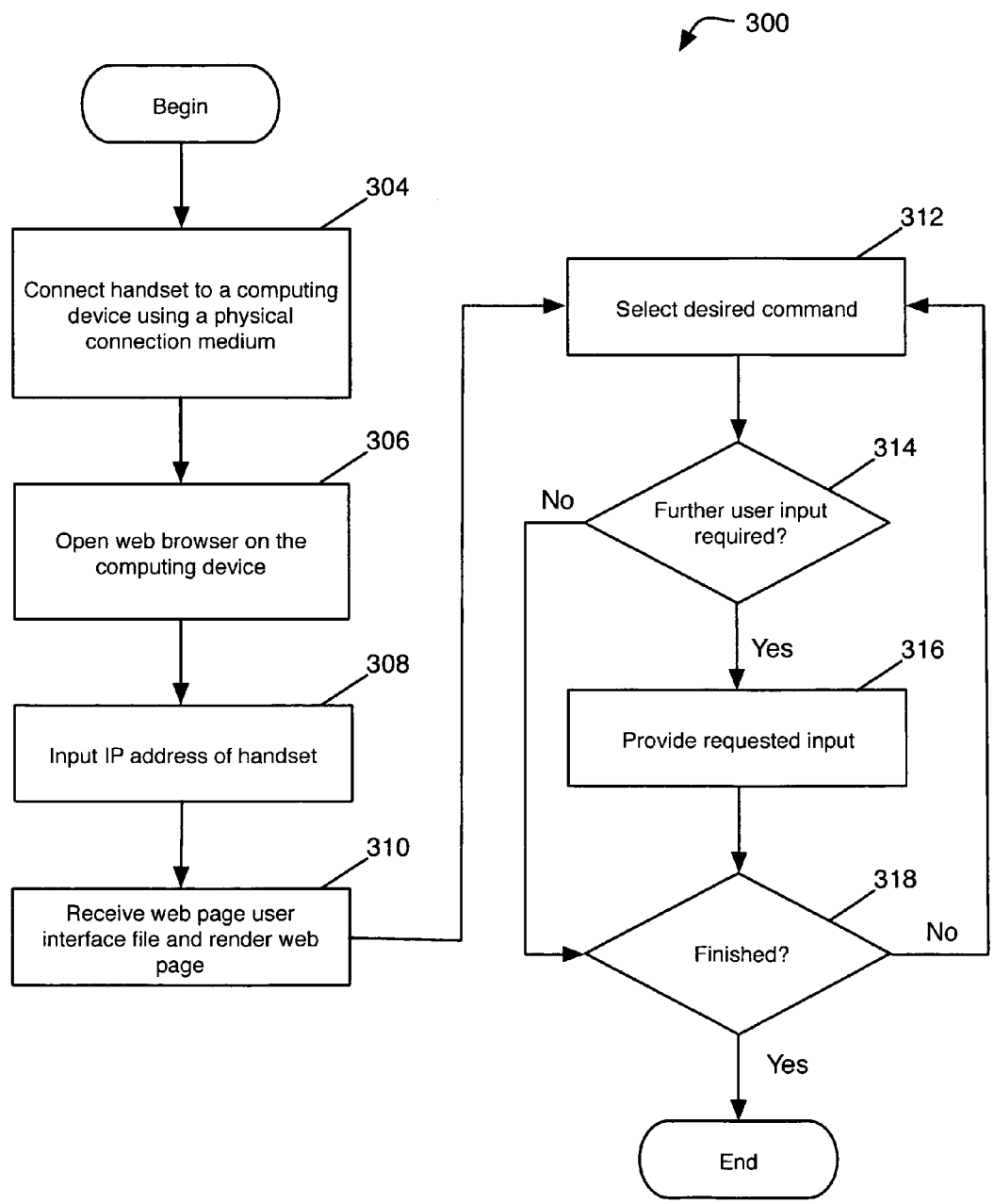
FIG. 3 is a flow diagram illustrating a user routine provided by one embodiment of the invention for communicating with a handset using a computing device via a private network.

Turning now to FIG. 3, an illustrative routine 300 will be described illustrating the operation that a user follows to communicate with a handset via a private network according to one embodiment of the invention. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 3 and 4 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 300 begins at operation 304, where the user connects the handset to a computing device using a physical connection medium. It should be appreciated that the physical connection medium may be a USB cable, a FIREWIRE cable, or any other connection medium. In addition to a physical connection medium, it should be understood that WI-FI, RF, BLUETOOTH, or any other wireless connection medium may also be used to establish a private network between the computing device and the handset. The routine proceeds to operation 306 where the user opens a web browser program located on the computing device. At operation 308, the user inputs the IP address assigned to the handset in order to obtain a web page file from the handset web server program. The rendered web page operates as a user interface for data transfer, synchronization, and management. The web page user interface file is received and the corresponding web page is rendered at operation 310.

At operation 312, the user selects a desired data management function. As previously discussed, the rendered web page presents a custom interface that may include any number of selectable data management functions. For example, buttons may exist for synchronizing or transferring any number and type of documents or information such as music files, picture files, contacts, electronic mail, calendar events, word processing documents, spreadsheets, applications, and firmware updates. At operation 314, a decision is made as to whether further user input is required. In some instances, a user may select an action that requires additional input. For example, a user may select an option for transferring specific files to the handset. After selecting a file transfer request button, the user may be prompted to browse for the desired files to be transferred. If further input is required, the user will provide the requested input at operation 316.

The routine then proceeds to operation 318 where a determination is made as to whether the user is finished managing data on the handset. If no further data management function buttons are selected, or if the user takes affirmative action to end the routine, such as closing the web browser program or logging out, then the routine ends. If the user takes an action that indicates that additional data management is to take place, then the routine returns to operation 312 and an additional data management function button is selected. However, if it is determined at operation 314 that no further user input is required, such as when a user selects an option for synchronizing application data files, then the routine moves to operation 318 where a determination is made as to whether the user is finished managing handset data, and the routine proceeds as described above.

Figure 4:
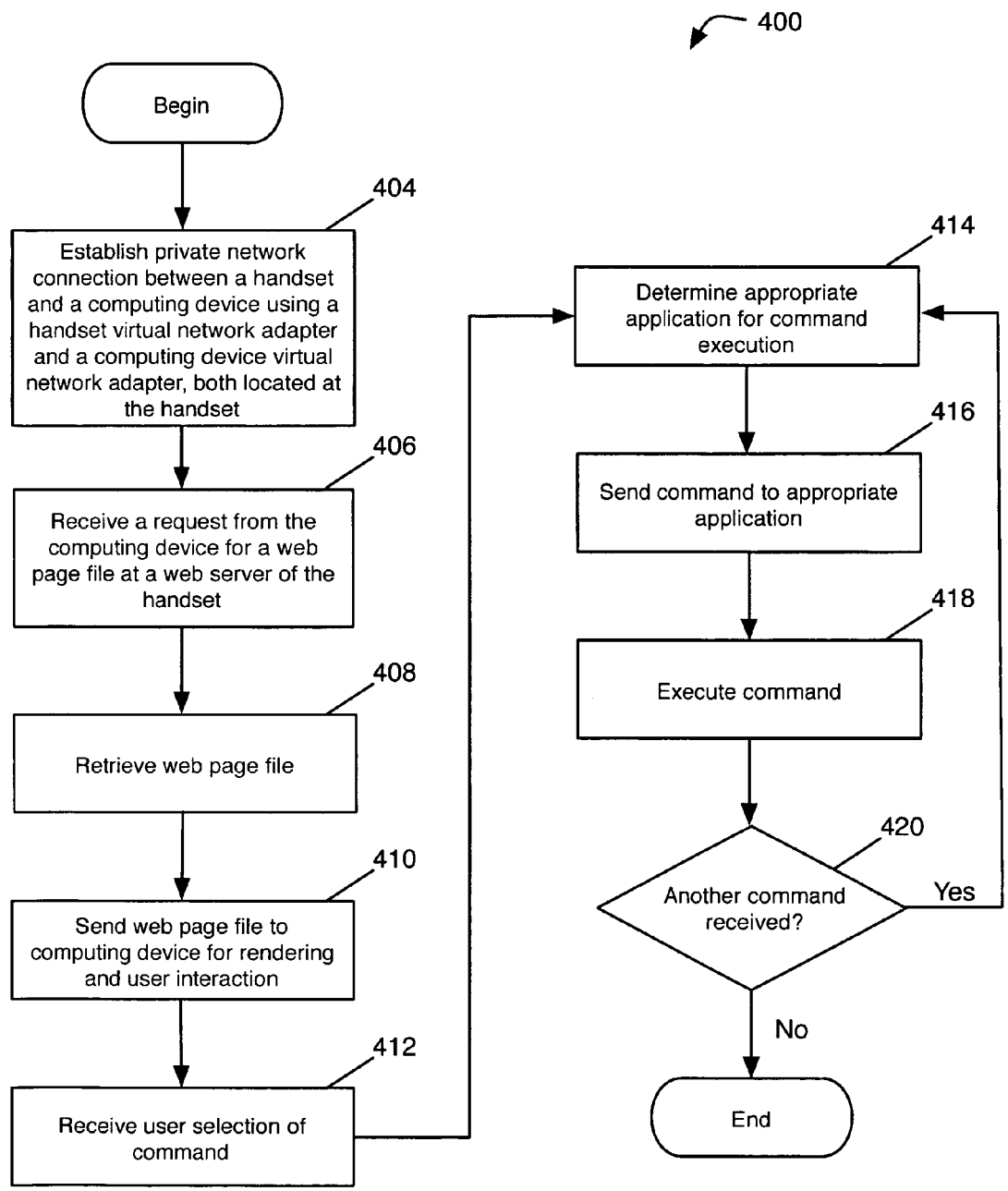
FIG. 4 is a flow diagram illustrating a handset routine provided by one embodiment of the invention for communicating with a handset using a computing device via a private network.

Turning now to FIG. 4, an illustrative routine 400 will be described illustrating the operation for communicating with a handset using a computing device will be described. The routine begins at operation 404 where a private network is established between the handset and the computing device using a handset virtual network adapter and a computing device virtual network adapter. Each virtual network adapter is located within the handset. At operation 406, the web server program of the handset receives a request from the computing device for a web page file. The request is made using an IP address of the handset. The handset retrieves the requested web page file at operation 408. The web page file is sent to the computing device for rendering and user interaction at operation 410. As discussed above with respect to FIG. 3, the rendered web page is a customized user interface containing any number of selectable data management commands.

At operation 412, the handset receives the user selection of a data management command. Also as previously discussed, the data management command may be instructions to synchronize data, store music, pictures, ring tones, contacts, or documents, or to install a firmware update or any other application. At operation 414, it is determined which application of the management software is appropriate for the particular data management command selected by the user. At operation 416, the command is sent to the appropriate application, and at operation 418, the command is executed. At operation 420, it is determined whether an additional command has been selected and received. If another command has been received, the routine returns to operation 414 where the appropriate application is determined. If another command has not been received, the routine ends.

Aspects of the present invention provide not only a simple, user-friendly method of transferring, synchronizing, and managing data via a private network comprising a handset and a computing device, but also a highly secure method of doing so. Because a private network between the handset and the computing device is established rather than utilizing the Internet or other wide area network, the user may be guaranteed privacy. This is particularly true when proper authentication methods commonly known in the art are used, such as requiring a user name and password or other biometric prior to establishing the private network.

It will be appreciated that embodiments of the present invention provide methods, handset, and computer-readable medium for communicating with a handset via a private network. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

I claim:

1. A non-transitory computer storage medium having stored thereon computer-executable instructions that, when executed by a cellular telephone, cause the cellular telephone to:

store, at the cellular telephone, a web page file comprising executable code that provides a user interface having a selectable command for managing data stored at the cellular telephone;

execute, at the cellular telephone, a cellular telephone virtual network adapter and a computing device virtual network adapter to establish a private network between the cellular telephone and a computing device communicating with the cellular telephone, the private network comprising the computing device virtual network adapter, the cellular telephone virtual network adapter, and a connection medium connecting the cellular telephone to the computing device;

receive, at the cellular telephone, a request for the web page file stored on the cellular telephone, the request being received from the computing device via the private network;

retrieve the web page file at the cellular telephone in response to the request; and send the web page file to the computing device via the private network.

2. The non-transitory computer storage medium of claim 1, wherein the connection medium comprises a direct physical connection medium.

3. The non-transitory computer storage medium of claim 2, wherein the direct physical connection medium comprises a USB connection.

4. The non-transitory computer storage medium of claim 2, wherein the direct physical connection medium comprises a FIREWIRE connection.

5. The non-transitory computer storage medium of claim 1, further comprising computer-executable instructions stored thereon that, when executed by the cellular telephone, cause the cellular telephone to:

receive data indicating selection of the command;

identify a management application recipient for the command selected; and send the command to the management application recipient for execution of the command.

6. The non-transitory computer storage medium of claim 5, wherein the command comprises a command to install a firmware update, and wherein the web page file comprises program code for retrieving the firmware update from the computing device upon receiving selection of the command to install the firmware update.

7. The non-transitory computer storage medium of claim 5, wherein the command comprises a command to store data sent from the computing device.

8. The non-transitory computer storage medium of claim 5, wherein the command comprises a command to synchronize data from a common application between the computing device and the cellular telephone.

9. The non-transitory computer storage medium of claim 8, wherein the common application comprises an appointment calendar.

10. The non-transitory computer storage medium of claim 8, wherein the common application comprises an electronic mail application.

11. A non-transitory computer storage medium having stored thereon computer-executable instructions that, when executed by a cellular telephone, cause the cellular telephone to:

store, at the cellular telephone, a web page file comprising executable code that provides a user interface having a selectable command for execution by a management application executed by the cellular telephone for managing data stored at the cellular telephone;

execute, at the cellular telephone, executable code for emulating a cellular telephone USB virtual network adapter and a computing device USB virtual network adapter to establish a private network between the cellular telephone and the computing device communicating with the cellular telephone, the private network comprising the cellular telephone USB virtual network adapter, the computing device USB virtual network adapter, and a USB cable connecting the cellular telephone to the computing device;

receive a request for the web page file stored at the cellular telephone, the request being received from the computing device via the private network;

retrieve the web page file at the cellular telephone in response to the request;

send the web page file to the computing device via the private network;

receive selection of the command from the computing device; and provide the command to the management application for execution.

12. A computer-implemented method comprising computer-implemented operations for:

storing, at a cellular telephone, a web page file comprising executable code that provides a user interface having a selectable command for managing data stored at the cellular telephone;

executing, at the cellular telephone, software for emulating a first virtual network adapter and a second virtual network adapter;

establishing, via execution of the software, a private network between the cellular telephone and a computing device in communication with the cellular telephone via a connection medium, the private network being provided by the first virtual network adapter, the second virtual network adapter, and the connection medium;

receiving, at the cellular telephone, a request for the web page file stored at the cellular telephone, the request being received from the computing device via the private network;

retrieving the web page file at the cellular telephone in response to receiving the request; and providing the web page file to the computing device via the private network.

13. The method of claim 12, wherein the second virtual network adapter comprises an endpoint controller that provides a connection port for connecting the cellular telephone to the computing device using the connection medium and program code executable by the cellular telephone to mediate between the connection medium and the first virtual network adapter.

14. The method of claim 13, wherein the connection medium comprises a USB connection and the endpoint controller comprises a USB endpoint controller.

15. The method of claim 12, wherein the web page file comprises instructions that, when rendered, provide a web page comprising a command selectable for execution by a management application on the cellular telephone.

16. The method of claim 15, further comprising:

receiving data indicating selection of the command;

sending the command to a management application associated with the command; and executing the command at the cellular telephone.

17. The method of claim 15, wherein the at least one command comprises a command to install a firmware update, and wherein the web page file comprises program code for retrieving the firmware update from the computing device.

18. The method of claim 15, wherein the at least one command comprises a command to store data sent from the computing device, the data being associated with one or more of a music management application or an image management application.

* * * * *